Aug. 15, 1933.  G. H. SCRAGG  1,922,502
AISLE SEAT FOR BUSSES
Filed Dec. 10, 1930  2 Sheets-Sheet 1

INVENTOR
George H. Scragg,
BY
Redding, Greeley, O'Shea & Campbell
HIS ATTORNEYS

Aug. 15, 1933.  G. H. SCRAGG  1,922,502
AISLE SEAT FOR BUSSES
Filed Dec. 10, 1930  2 Sheets-Sheet 2
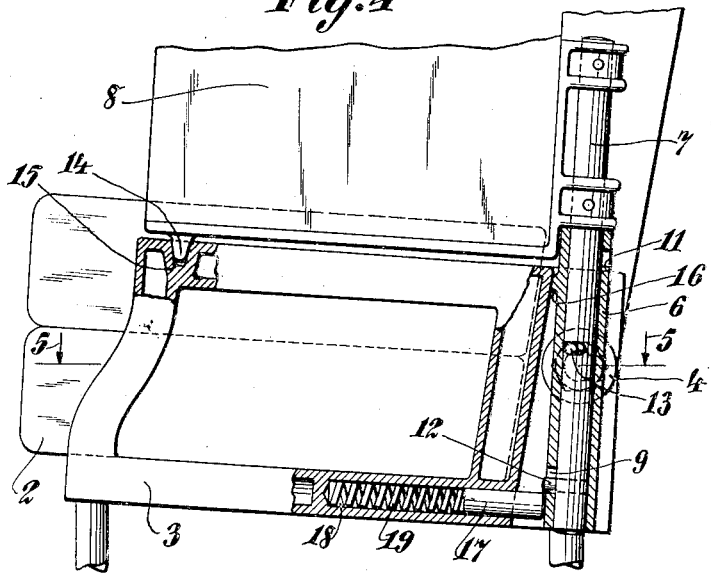
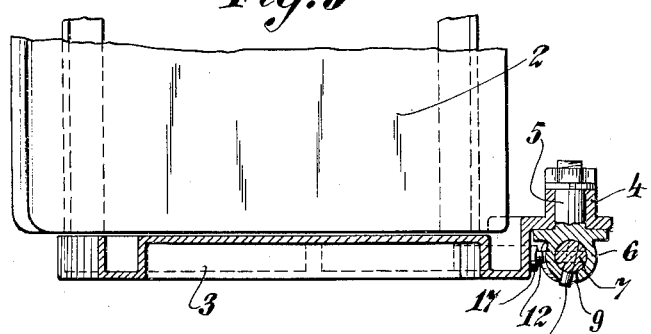
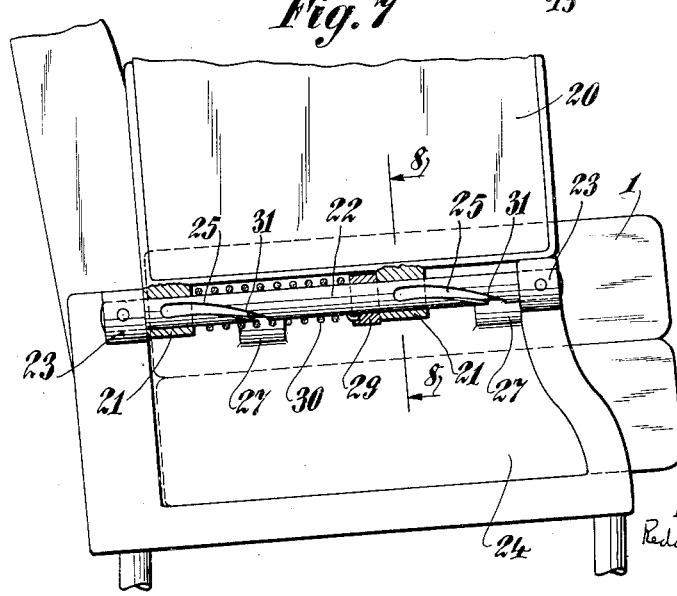
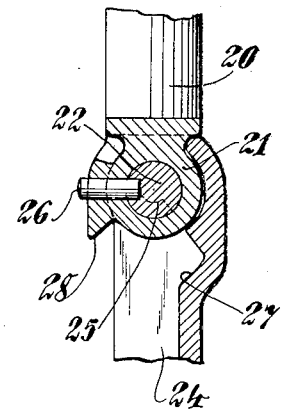
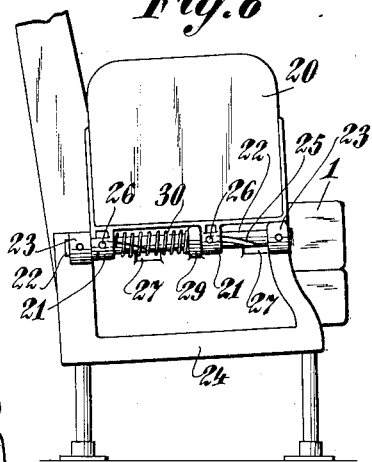
INVENTOR
George H. Scragg,
BY
Redding, Greeley, O'Shea & Campbell
HIS ATTORNEYS Patented Aug. 15, 1933

1,922,502

UNITED STATES PATENT OFFICE 1,922,502

AISLE SEAT FOR BUSSES

George H. Scragg, New York, N. Y., assignor to International Motor Company, New York, N. Y., a Corporation of Delaware Application December 10, 1930
Serial No. 501,260

6 Claims. (Cl. 155—33)

The present invention relates to seats for motor vehicles and embodies, more specifically, an improved convertible form of aisle seat by means of which the aisle space of a motor vehicle may be utilized as a temporary seating space.

With the seating arrangement usually followed in commercial vehicles for passenger accommodation, there is provided a central aisle between longitudinal rows of seats. The necessity of preserving the accessibility of remotely positioned seats requires that aisle space be available. When the seats are fully occupied, further space utilized by passengers is the standing space provided by the aisle. In order that this standing space may be utilized temporarily as seating space, without destroying the capacity of the aisle to permit the ingress and egress of passengers from the vehicle seats, the present invention proposes to provide a collapsible seat which is readily moved from a normally inoperative position, at which time it does not obstruct the aisle, to an operative position within the aisle.

More specifically, it is proposed to utilize the arm rests of adjacent seats as the seat and back, respectively, of a collapsible aisle seat, thus affording a convenient but temporary seat for passengers who would otherwise be required to stand.

An object of the invention, accordingly, is to provide a seat for a motor vehicle, the elements of which are adapted to be moved to and from positions wherein they do not form obstructions to the aisle.

A further object of the invention is to provide a seat of the above character, wherein the seat and back portions are adapted to be moved into a normally restricted position, in which position they serve as the arm rests of the standard motor vehicle passenger seats.

A further object of the invention is to provide a means for automatically positioning the seat and back portions of a temporary aisle seat in proper relation with respect to an occupant during movement thereof into an open position, whereby greater comfort is afforded the occupant.

A further object of the invention is to provide, in a seat of the above character, a means for imparting a cushioning effect to the back of the seat.

A further object of the invention is to provide a seat of the above character, wherein the seat and back portions will normally move to a position of repose in which position these portions constitute the arm rests of the usual vehicle passenger seats.

Further objects, not specifically enumerated above, will be apparent as the invention is described in greater detail in connection with the accompanying drawings, wherein:

Figure 4 is an enlarged view in side elevation, partly broken away and in section, showing the convertible arm rest structure of the seat shown in Figure 2.

Figure 5 is a view in section, taken on line 5—5 of Figure 4 and looking in the direction of the arrows.

Figure 6 is a view in side elevation, showing the arm rest of Figure 3 moved into its normal position of repose.

Figure 7 is a view similar to Figure 6, showing the elements thereof enlarged.

Figure 8 is a view in section, taken on line 8—8 of Figure 7, and looking in the direction of the arrows.

Figure 1:
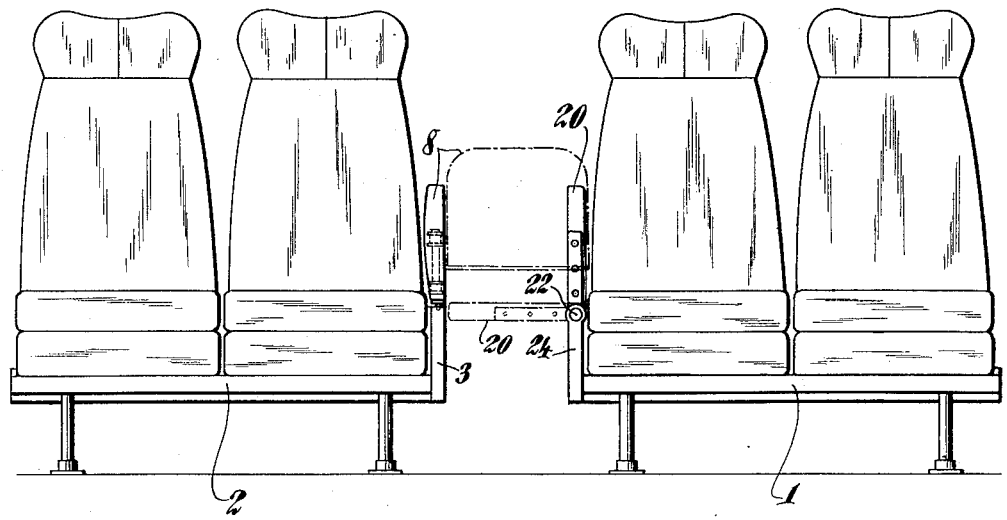
Figure 1 is a view in front elevation, showing the standard passenger seats of a motor vehicle formed with arm rests adapted to be moved into a position indicated in dot and dash lines, in which position these elements form an aisle seat.

Referring to the above drawings, right and left hand pairs of passenger seats 1 and 2, respectively, are illustrated, these seats being of any standard type and forming no part of the present invention, save in so far as the arm rests thereof are modified as described hereinafter. Upon the frame 3 of seat 2, a bearing 4 is provided, a stub shaft 5 being journaled therein to swivel about a horizontal axis. This stub shaft is mounted upon a vertical sleeve 6 which is adapted to receive a shaft 7 mounted for sliding and rotatable movement therein. Shaft 7 has secured thereto an arm rest 8 which, in the position shown in Figure 1, normally serves as the arm rest for the left hand seats 2.

Figure 2:
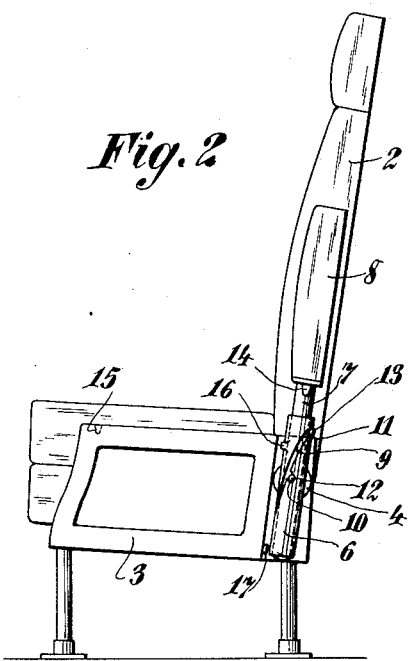
Figure 2 is a view in side elevation, showing the left hand pair of standard seats of Figure 1, as viewed from the aisle.

A helical groove 9 is formed in the sleeve 6 and provided with notches 10 and 11 within which groove, pins 12 and 13 engage. These pins are mounted in the shaft 7 and thus cause the shaft to be turned radially through 90° when the arm rest 8 is lifted into the position shown in Figure 2. In this position, the pins 12 and 13 engage the respective notches 10 and 11 to hold the arm rest which serves as the back for the aisle seat normally in the position shown in Figure 2. A slight forward turning of the seat back, however, causes the pins 12 and 13 to disengage the respective notches 10 and 11 and the member then swings into the normal position as shown in Figure 4. In this position, a tapered stud or pin 14 in the arm rest 8 engages a recess 15 in the frame 3 to hold the arm rest normally in a position of repose.

Upon the sleeve 6, a boss 16 is formed to engage the rear side of frame 3 and prevent rocking movement of the arm rest forwardly beyond a predetermined limit. A plunger 17 is slidably mounted in a chamber 18, formed in the side frame 3 and is normally urged outwardly by a spring 19. This plunger engages the lower extremity of the sleeve 6 and thus serves as a means for cushioning the arm rest 8 when in a position to form a back rest as an aisle seat. The seat portion of the aisle seat is formed by the arm rest 20 of the right hand seats 1. This arm rest is formed with hinge members 21 which are journaled upon a shaft 22. The shaft 22 is mounted in brackets 23 and 29 formed on the side frame 24 of the right hand seats 1 and is formed with helical grooves 25. Pins 26 are carried by the hinge members 21 and project inwardly to engage the helical grooves 25. When the arm rest is advanced forwardly in a horizontal plane, the cam action due to the engagement of pins 26 with the helical grooves 25, imparts a radial movement of 90° to the hinge members 21 simultaneously with their forward sliding movement on the shaft 22. Bosses 27 are formed on the seat frame and are adapted to be engaged by toes 28 to limit the downward movement of the arm rest to the horizontal seat position shown in Figure 3.

Figure 3:
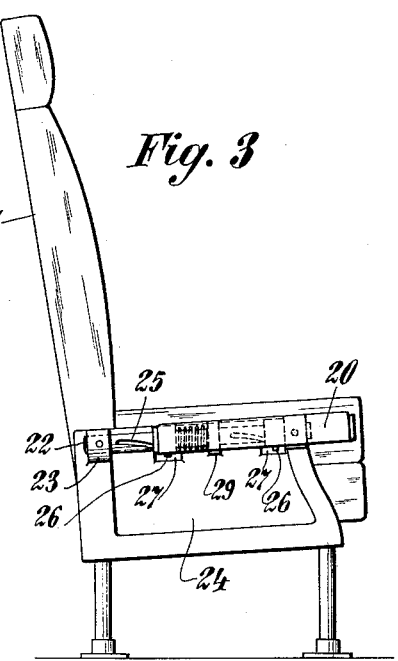
Figure 3 is a view similar to Figure 2 showing the right hand pair of seats of Figure 1.

One end of a compression and torsion spring 30, surrounding the shaft 22, is seated against one of the hinge members 21 and the other end is seated against the collar or bracket 29, as shown in Figures 3 and 7. In its extended position the spring is under compression and when it is compressed, as shown in Figure 3, it exerts its maximum pressure on the hinge member 21, which tends to slide the latter backwardly on the shaft 22. This movement is prevented by the engagement of the pins 26 with radial notches 31 at the forward ends of the helical grooves 25, so long as the member 20 is held in a horizontal position by the weight of the occupant of the aisle seat. When he arises the spring 30, to which a torsional effort has been imparted due to the radial movement of the hinge member 21 and the engagement of the forward, bent-in end of the spring with the bracket 29 and of its rear bent-in end with the hinge member 21, causes a slight radial movement of the latter, sufficient to disengage the pins 26 from the notches 31. When this function of the spring has been accomplished, it acts as an extension spring to slide the hinge member backwardly on the shaft 22. The simultaneous cam-action due to the engagement of the pins 26 with the helical grooves 25 in the shaft 22, causes the hinge members 21 to turn on the shaft, thereby moving the member 20 from its horizontal seat position to its vertical arm-rest position. The initial radial effort of the spring 30, and its following extension effort, therefore cause the automatic return of the member 20 to its arm-rest position when the occupant arises from the seat. The aisle is readily cleared by this automatic action and the return of the member 5 from its back-rest position to its arm-rest position due to the light touch of a person passing through the aisle, as previously described.

While the invention has been described with specific reference to the accompanying drawings, it is not to be limited, save as defined in the appended claims.

I claim as my invention:

1. A seat having separately movable back and seat portions, means to mount the portions in operative relationship, means on the mounting means to journal the portions about independent axes, one of said journaling means including means to accommodate axial movement of one of the portions, and means on the mounting means to turn one of the portions radially as it is moved axially whereby the said one section is maintained in a normal position and the effective size of the resulting seat structure is increased when the seat portions are moved to a seating position.

2. A seat having separately movable back and seat portions, means to mount the portions in operative relationship, means on the mounting means to journal the back portion about a vertical axis to accommodate axial movement thereof, means on the mounting means to journal the seat portion about a horizontal axis to accommodate axial movement thereof, means on the mounting means to turn the seat portion radially as it is moved axially away from the back portion, and means to turn the back portion radially as it is moved axially away from the seat portion whereby the portions are maintained in normal positions and the effective size of the resulting seat structure is increased when the portions are moved into seating position.

3. In combination with two seats, the adjacent ends whereof are spaced to afford room for a collapsible seat, an arm rest for each of the seats on the adjacent ends thereof, means to journal one of the arm rests upon a horizontal axis on the adjacent end of one of the seats and to accommodate axial movement thereof, means to produce axial movement of the rest upon pivotal movement thereof, means to journal the other arm rest upon a vertical axis upon the adjacent end of the other seat and to accommodate axial movement thereof, and means to turn the rests radially as they are moved axially whereby the arm rests are maintained in a normal arm rest position and cooperate to form the seat and back members of a collapsible seat in the space between the adjacent ends of the first two named seats.

4. In combination with two seats, the adjacent ends whereof are spaced to afford room for a collapsible seat, an arm rest for each of the seats on the adjacent ends thereof, means to journal one of the arm rests upon a horizontal axis on the adjacent end of one of the seats, means to journal the other arm rest upon a vertical axis upon the adjacent end of the other seat, one of said journalling means accommodating axial movement of its arm rest, and means to turn one of the rests radially as it is moved axially whereby the arm rests are maintained in a normal arm rest position and cooperate to form the seat and back members of a collapsible seat in the space between the adjacent ends of the two first named seats.

5. A seat having separately movable back and seat portions, means to journal the back portion upon a vertical axis in a normal position of repose, said means accommodating lifting motion of said back portion, means to turn the back portion radially as it is lifted from its normal position of repose, and means to hold the back portion in an elevated position.

6. A seat having separately movable back and seat portions, means to journal the back portion upon a vertical axis in a normal position of repose, said means accommodating lifting motion of the said back portion, means to turn the back portion radially as it is lifted from its normal position of repose, means to hold the back portion in an elevated position, and means to hold the back portion in a normal position.

GEORGE H. SCRAGG.